(12) United States Patent
Ma et al.

(10) Patent No.: US 8,159,950 B2
(45) Date of Patent: Apr. 17, 2012

(54) DETERMINING PROCESSOR OCCUPANCY OF A CLUSTER OF HOME LOCATION REGISTERS

(75) Inventors: David C. Ma, Naperville, IL (US);
Dennis J. Wiest, Naperville, IL (US);
Barrett D. Milliken, Evanston, IL (US)

(73) Assignee: Alcatel Lucent, Paris (FR)

( * ) Notice: Subject to any disclaimer, the term of this patent is extended or adjusted under 35 U.S.C. 154(b) by 1150 days.

(21) Appl. No.: 11/851,035

(22) Filed: Sep. 6, 2007

(65) Prior Publication Data

US 2009/0069009 A1    Mar. 12, 2009

(51) Int. Cl.
*H04L 12/26* (2006.01)
(52) U.S. Cl. ......... 370/234; 370/229; 370/230; 370/235
(58) Field of Classification Search .................. 370/331, 370/252, 443, 447, 462, 228, 229, 234, 235; 455/436–439, 510, 515, 423, 424, 254, 422, 455/450, 453, 445, 522, 560; 702/57, 62, 702/47
See application file for complete search history.

(56) References Cited

U.S. PATENT DOCUMENTS

| | | | |
|---|---|---|---|
| 6,661,776 B1 * | 12/2003 | Kaufman et al. | 370/234 |
| 2002/0072358 A1 * | 6/2002 | Schneider et al. | 455/423 |
| 2005/0256971 A1 * | 11/2005 | Colrain et al. | 709/238 |

* cited by examiner

*Primary Examiner* — Hassan Phillips
*Assistant Examiner* — Anez Ebrahim
(74) *Attorney, Agent, or Firm* — Duft Bornsen & Fishman LLP

(57) ABSTRACT

Methods and computer readable mediums are provided for determining the processor occupancy of a cluster of HLR registers. A deterministic-based performance model is utilized to determine the processor occupancy based on a number of nodes in the cluster, a number of call attempts per unit time, a number of autonomous registrations, a processor utilization for processing each call attempt and a processor utilization for processing each autonomous registration. The models may be utilized to determine the processor occupancy of each node in the cluster if a selected number of HLR nodes are utilized, such that an iterative process may be employed to select a number of HLR nodes in order for each HLR node to operate under a node processor occupancy threshold.

20 Claims, 10 Drawing Sheets

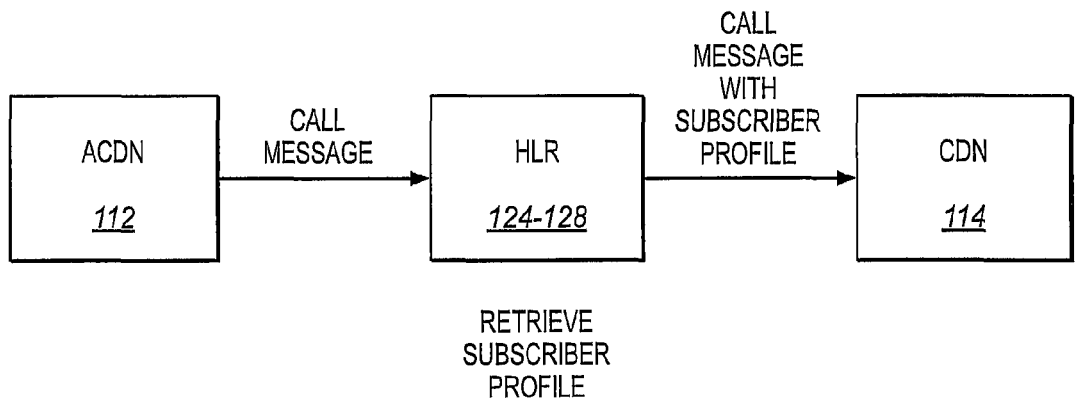
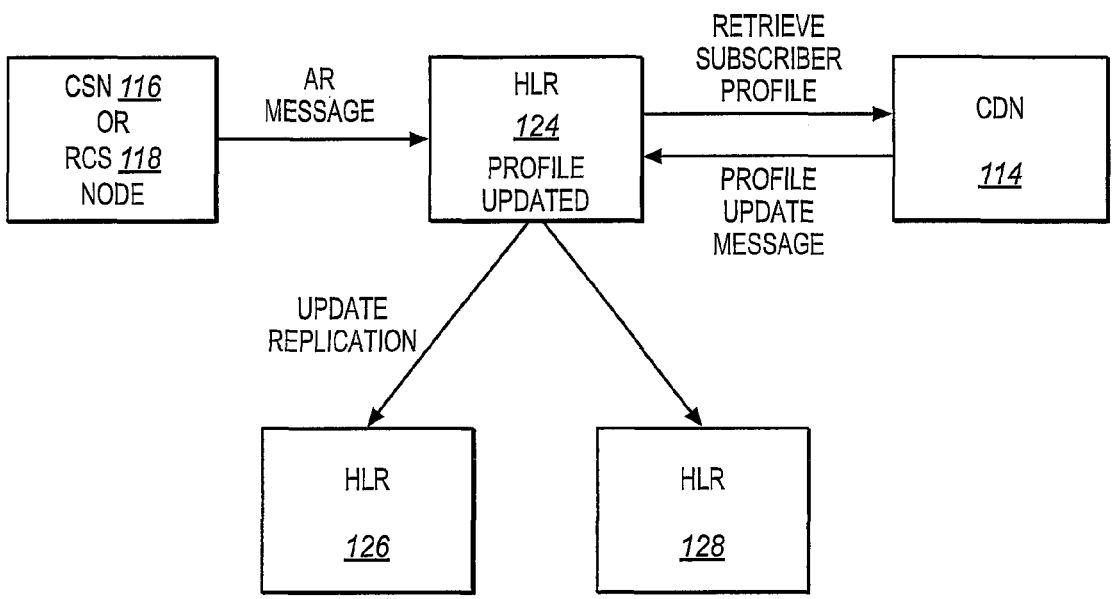

FIG. 5

Nodal Performance Log Table ap22: System-Level: 2006-05-17 19:00:00.535314: Interval = 3599.800 sec

| PID CNT | Free Mem | Idle CPU | RT CPU | OC CPU | AP CPU | CPU Gap | EIN CPU | Operations per Sec ||||| |
|---|---|---|---|---|---|---|---|---|---|---|---|---|
| | | | | | | | | VCS | ICS | sysc | Fork | Exec | Msg |
| 124 | 693.9M | 68.44 | 17.00 | 17 | 23.51 | 8.05 | 6 | 1357 | 32 | 12724 | 0.8 | 1.0 | 2949 |

Process-Level Information

| RANK | PID | SIZE | RSIZE | PRI | STK | HEAP | MSG | VCS | ICS | %CPU | NAME/NLWP |
|---|---|---|---|---|---|---|---|---|---|---|---|
| 1 | 3285 | 27.0M | 11.1M | 100 | 32.8K | 8.31M | 1327 | 215 | 2 | 6.49 | UXipmgr2/11 |
| 2 | 3728 | 1.87G | 125M | 100 | 24.6K | 213K | 904 | 51 | 0 | 4.91 | LRprofileUpdate/1 |
| 3 | 3638 | 49.9M | 23.5M | 29 | 49.2K | 3.65M | 0 | 101 | 4 | 1.91 | java/20 |
| 4 | 3727 | 2.18G | 340M | 100 | 24.6K | 213K | 299 | 47 | 0 | 1.68 | LRprofileRead/1 |
| 5 | 3729 | 2.18G | 340M | 100 | 16.4K | 213K | 97 | 34 | 0 | 1.44 | LRarAdmin/1 |
| 6 | 3361 | 10.4M | 7.41M | 100 | 16.4K | 205K | 0 | 109 | 0 | 1.31 | imswriter/1 |

FIG. 6

Process PO and Message Count of an IHLR Configuration with 4 Nodes in the Cluster and MAS Feature On

| Node | LRprofile Read | LRprofile Update | LRarAdmin | UXipmgr | RT CPU% |
|---|---|---|---|---|---|
| | (msg/s)/PO% | (msg/s)/PO% | (msg/s)/PO% | (msg/s)/PO% | |
| 1 | 194/1.18 | 651/3.91 | 59/0.88 | 930/5.24 | 13.8 |
| 2 | 264/1.42 | 709/4.02 | 69/0.99 | 1064/5.77 | 14.88 |
| 3 | 200/1.12 | 658/4.07 | 60/0.90 | 941/5.28 | 13.95 |
| 4 | 280/1.46 | 764/4.29 | 71/1.01 | 1137/5.89 | 15.38 |
| Sum | 938/5.15 | 2782/16.29 | 259/3.78 | 4072/22.18 | Cluster PO 58.01% |
| msg cost C1~C4 | C1=55 us | C2=58 us | C3=146 us | C4=54 us | |

FIG. 7  Process PO and Message Count of an IHLR Configuration with 6 Nodes in the Cluster and MAS Feature On

| Node | LRprofile Read (msg/s)/PO% | LRprofile Update (msg/s)/PO% | LRarAdm in (msg/s)/PO% | UXipmgr (msg/s)/PO% | RT CPU% |
|---|---|---|---|---|---|
| 1 | 160/1.05 | 768/4.24 | 63/0.85 | 1015/6.09 | 14.93 |
| 2 | 155/1.04 | 760/4.20 | 61/0.93 | 1000/5.77 | 14.53 |
| 3 | 174/1.11 | 797/4.30 | 66/0.97 | 1063/5.98 | 15 |
| 4 | 170/1.12 | 791/4.31 | 65/0.95 | 1050/5.94 | 14.99 |
| 5 | 136/0.91 | 716/4.14 | 58/0.67 | 936/5.21 | 13.33 |
| 6 | 212/1.28 | 875/4.51 | 73/1.03 | 1185/6.13 | 15.31 |
| Sum | 1007/6.51 | 4698/25.7 | 386/5.40 | 6250/35.12 | Cluster PO 88.09% |
| msg cost C1~C4 | C1=65 us | C2=54 us | C3=140 us | C4=56 us | |

FIG. 8  Process PO and Message Count of an Highly Networked IHLR Configuration with 4 Nodes in the Cluster and MAS Feature On

| Node | LRprofile Read (msg/s)/PO% | LRprofile Update (msg/s)/PO% | LRarAdm in (msg/s)/PO% | UXipmgr (msg/s)/PO% | RT CPU% |
|---|---|---|---|---|---|
| 1 | 308/1.67 | 902/5.79 | 125/1.97 | 1375/6.88 | 18.82 |
| 2 | 313/1.65 | 914/6.03 | 128/1.96 | 1393/6.84 | 18.89 |
| 3 | 320/1.69 | 923/5.84 | 130/1.99 | 1410/6.95 | 19.02 |
| 4 | 301/1.62 | 897/5.74 | 127/1.96 | 1365/7.12 | 18.94 |
| Sum | 1242/6.63 | 3636/23.4 | 510/7.88 | 5543/27.79 | Cluster PO 75.77% |
| msg cost C1~C4 | C1=53 us | C2=64 us | C3=154 us | C4=50 us | |

FIG. 9

Process PO and Message Count of an IHLR Configuration
with 2 Nodes in the Cluster and without MAS Feature

| Node | LRprofile Read (msg/s)/PO% | LRprofile Update (msg/s)/PO% | LRarAdmin (msg/s)/PO% | UXipmgr (msg/s)/PO% | RT CPU% |
|---|---|---|---|---|---|
| 1 | 723/3.62 | 454/4.21 | 192/2.57 | 1404/8.76 | 21.34 |
| 2 | 704/3.51 | 449/4.25 | 188/2.57 | 1375/8.60 | 21.02 |
| Sum | 1427/7.13 | 903/8.46 | 370/5.14 | 2779/17.36 | Cluster PO 42.36% |
| msg cost C1~C4 | C1=50 us | C2=93 us | C3=139 us | C4-62 us | |

FIG. 10

Process PO and Message Count of an IHLR Configuration
with 4 Nodes in the Cluster and without MAS Feature

| Node | LRprofile Read (msg/s)/PO% | LRprofile Update (msg/s)/PO% | LRarAdmin (msg/s)/PO% | UXipmgr (msg/s)/PO% | RT CPU% |
|---|---|---|---|---|---|
| 1 | 195/1.22 | 381/2.54 | 63/0.95 | 665/4.64 | 11.92 |
| 2 | 267/1.46 | 434/2.72 | 74/1.08 | 799/5.20 | 11.07 |
| 3 | 188/1.07 | 376/2.66 | 63/0.96 | 650/4.54 | 11.73 |
| 4 | 271/1.43 | 439/2.81 | 75/1.06 | 870/5.13 | 13.13 |
| Sum | 921/5.18 | 1630/10.73 | 275/4.05 | 2921/19.51 | Cluster PO 47.85% |
| msg cost C1~C4 | C1=56 us | C2=65 us | C3=147 us | C4=66 us | |

FIG. 11

AR/bhca and the Calculated Profile Update Ratios in Busy Hours

| AR/bhca | profile update ratio | AR/bhca | profile update ratio | AR/bhca | profile update ratio | AR/bhca |
|---|---|---|---|---|---|---|
| 1.03 | 0.39 | 1.93 | 0.52 | 2.66 | 0.5 | 3.4 |
| 1.08 | 0.38 | 2.08 | 0.51 | 2.72 | 0.51 | 3.63 |
| 1.11 | 0.42 | 2.16 | 0.53 | 2.91 | 0.57 | 3.66 |
| 1.73 | 0.52 | 2.2 | 0.56 | 3.21 | 0.59 | 3.71 |
| 1.79 | 0.42 | 2.24 | 0.55 | 3.26 | 0.59 | 3.74 |
| 1.91 | 0.53 | 2.48 | 0.49 | 3.35 | 0.59 | 3.84 |

FIG. 12

Recommended Values of Profile Update Ratio in Busy Hours for Capacity Prediction

| AR/bhca | Recommended values of profile update ratio in capacity prediction |
|---|---|
| > 3.6 | 0.65 |
| 2.5 - 3.5 | 0.6 |
| 1.5 - 2.5 | 0.55 |
| < 1.5 | 0.5 |

FIG. 13

Effect of Profile Update Ratio on the Cluster BHCA Capacity

| Number of nodes in the cluster | | 1 | 2 | 3 | 4 | 5 |
|---|---|---|---|---|---|---|
| Available Cluster PO | | 75% | 150% | 225% | 300% | 375% |
| Cluster Capacity (BHCA) | Profile Update Ratio = 0.5 | 1,350,000 | 2,150,000 | 2,650,000 | 3,000,000 | 3,300,000 |
| | Profile Update Ratio = 0.75 | 1,250,000 | 1,850,000 | 2,250,000 | 2,400,000 | 2,550,000 |
| | Profile Update Ratio = 1 | 1,200,000 | 1,630,000 | 1,850,000 | 2,000,000 | 2,100,000 |

FIG. 14

Performance Improvement and Update Delay of Various Bundling Factors

| Number of Updates in a Bundle | 1 B=1, no bundling | 3 B=0.333 | 5 B=0.2 | 10 B=0.1 | 15 B=0.066 | 20 B=0.05 |
|---|---|---|---|---|---|---|
| Update delay (ms) | 2.5 | 7.5 | 12.5 | 25 | 37.5 | 50 |
| Cluster PO (%) | 375% | 226% | 197% | 174% | 167% | 163% |
| Factor of capacity improvement over the case with no bundling, B=1 | 1 | 1.65 | 1.9 | 2.15 | 2.24 | 2.3 |

DETERMINING PROCESSOR OCCUPANCY OF A CLUSTER OF HOME LOCATION REGISTERS

BACKGROUND OF THE INVENTION

1. Field of the Invention

The invention is related to the field of communications, and in particular, to methods and computer readable mediums for determining processor occupancy (PO) and capacity of home location register (HLR) nodes of an HLR cluster.

2. Statement of the Problem

A large capacity mobile switching center (MSC) in a wireless communication network may include millions of subscriber profile records managed by an HLR and/or a visitor location register (VLR) system. The management functionality of an HLR includes retrieving a subscriber profile record responsive to a call, autonomous registration, or another event, and providing the MSC (or other network elements) with the content of the subscriber profile record. The HLR is also responsible for updating a subscriber profile record if changes are necessary as a result of an event (such as a call, location change, etc.)

Because of the large number of subscriber profile records managed by an HLR, one HLR application processor often can't handle the workload for an MSC. Thus, a cluster of HLR nodes is often utilized, with the load of requests from the MSC balanced across the cluster of HLR nodes. In this type of configuration, the HLR nodes of the cluster should maintain a consistent profile database, because any of the nodes could be responsible for processing a request for a subscriber profile record at any particular time. Therefore, an updated record (including insertion of a new record or deletion of an existing record) on one node should be replicated to the peer nodes in the cluster in order to maintain a consistent profile for each subscriber of the wireless communication network.

As the workload of an MSC increases, more HLR nodes are added to the HLR cluster. As a result, the update and replication processing for the subscriber profile records across the HLR nodes is increased significantly, especially when a profile update is required for every call, autonomous registration, or other event. This update and replication process diminishes the capacity of each HLR node, because a significant amount of processing time is expended transmitting messages between the HLR nodes to update profile records and updating the database on each HLR node. Therefore, there is not a straight linear relationship between the number of HLR nodes in an HLR cluster and the capacity of the HLR cluster. Thus, it is a problem for network operators to determine the processor occupancy of a cluster of HLR nodes, and the number of HLR nodes needed to handle the workload of the MSC.

SUMMARY OF THE SOLUTION

The invention solves the above problems and other problems by determining the processor occupancy of a cluster of HLR nodes, and determining a number of HLR nodes for an HLR cluster based on the processor occupancy. One exemplary embodiment of the invention utilizes performance modeling of a cluster of HLR nodes handling subscriber profile querying and updating for an MSC to determine the processor occupancy of the cluster of HLRs. The performance modeling is determined based on a number of nodes in the HLR cluster, a number of call attempts per unit time, a number of autonomous registrations, a processor utilization for each profile read message (i.e., a subscriber profile query), a processor utilization for each profile update message (i.e., a profile updated responsive to an event), a processor utilization for each autonomous registration, and a processor utilization for processing each message between nodes (C4) (i.e., a replication process). Similar performance modeling of the cluster of HLRs nodes may be utilized to determine the processor occupancy of each node in the cluster if a selected number of HLR nodes are utilized, such that an iterative process may be employed to determine a number of HLR nodes for the HLR cluster in order for each HLR node to operate under a node processor occupancy threshold. Advantageously, a network operator may determine the correct number of HLR nodes for a cluster needed to handle the workload for an associated MSC without deploying additional unneeded resources (i.e., too many HLR nodes).

An exemplary embodiment of the invention comprises a method for determining processor occupancy of a cluster of HLRs. The method comprises defining a number of nodes in the cluster (N), defining a number of call attempts per unit time (CA_time), and defining a number of autonomous registrations (ARs) per call attempt (AR_CA). The method further comprises defining a processor utilization for processing each autonomous registration (C_AR) and processor utilization for processing each call attempt (C_CA). The method further comprises determining a processor occupancy of the cluster based on N, CA_time, AR_CA, AR_AR and C_CA.

In one exemplary embodiment of the invention, the processor utilization for processing each call attempt (C_CA) may be defined based on the processor utilization for each profile read message (C1), a processor utilization for each profile update message (C2), and a processor utilization for processing each message between the HLR nodes (C4). The processor utilization for processing each autonomous registration (C_AR) may be defined based on the processor utilization for each profile read message (C1), a processor utilization for each profile update message (C2), a processor utilization for each autonomous registration (C3), and a processor utilization for processing each message between the HLR nodes (C4). The method further comprises defining a processor utilization of overhead (C5) not described by C1 to C4 and determining a processor occupancy of the cluster based on N, CA_time, AR_CA, C1, C2, C3, C4 and C5.

In one exemplary embodiment of the invention, the processor occupancy is equal to $2*K*C1+(2*N-1)*K*C2+J*C3+((2*N+1)*K*J)*C4+C5*N$, with K equal to $(AR\_CA+1)*CA\_time$, and J equal to $(AR\_CA*CA\_time)$.

In another exemplary embodiment of the invention, the method further comprises defining a profile update ratio (F) of how often a user profile is updated. The processor occupancy of the cluster is then equal to $2*K*C1+(2*N-1)*K*F*C2+J*C3+(2*K+2*(N-1)*K*F+J)*C4+C5*N$, with K equal to $(AR\_CA+1)*CA\_time$, and J equal to $(AR\_CA*CA\_time)$.

In another exemplary embodiment of the invention, the method comprises defining a bundling ratio (B) based on a number of update messages that are bundled into one transmission between nodes, and defining a processor utilization (C2_bundle) for processing a bundle of update messages. The processor occupancy of the cluster is then equal to $2*K*C1+((K+K*B*(N-1)*C2+K*B*(N-1))*C2\_bundle+J*C3+(3*K+2*K*B*(N-1)+J)*C4\ 30\ C5*N$, with K equal to $(AR\_CA+1)*CA\_time$, and J equal to $(AR\_CA*CA\_time)$.

In another exemplary embodiment of the invention, the processor occupancy of the cluster is equal to $2*K*C1+(K+K*B*(N-1))*F*C2+K*B*(N-1)*C2\_bundle+J*C3+((3*K*F+2*K*B*F*(N-1)+J)*C4+C5*N$, with K equal to $(AR\_CA+1)*CA\_time$, and J equal to $(AR\_CA*CA\_time)$.

Another exemplary embodiment of the invention comprises a method for determining a number of HLR nodes for an HLR cluster. The method comprises receiving user input comprising a number of call attempts per unit time (CA_time), and receiving user input comprising a number of autonomous registrations per call attempt (AR_CA). The method further comprises receiving user input comprising a processor utilization for each profile read message (C1), a processor utilization for each profile update message (C2), a processor utilization for each autonomous registration (C3), a processor utilization for processing each message between nodes (C4), and a processor utilization of overhead (C5) for processes not described by C1 to C4. The method further comprises receiving user input comprising a node processor occupancy threshold, and estimating the number of HLR nodes (N) needed for the BLR cluster such that a node processor occupancy of each of the HLR nodes is less than or equal to the node processor occupancy threshold. The estimation step comprises recursively performing the following for each value of N until the processor occupancy of each node is less than or equal to the node processor occupancy threshold: determining a processor occupancy of the cluster based on N, CA_time, AR_CA, C1, C2, C3, C4 and C5; determining the processor occupancy of each of the HLR nodes, the processor occupancy of each node being equal to the processor occupancy of the cluster divided by N; determining whether the processor occupancy of each node is less than or equal to the node processor occupancy threshold; outputting the value of N responsive to determining that the processor occupancy of each node is less than or equal to the node processor occupancy threshold; and incrementing the value of N responsive to determining that the processor occupancy of each node is greater than the node processor occupancy threshold.

The invention may include other exemplary embodiments described below.

DESCRIPTION OF THE DRAWINGS

The same reference number represents the same element or same type of element on all drawings.

FIG. 2 illustrates a message flow of a call origination and termination in an exemplary embodiment of the invention.

FIG. 3 illustrates a message flow of an autonomous registration in an exemplary embodiment of the invention.

FIG. 5 illustrates a typical nodal performance log table in an exemplary embodiment of the invention.

FIG. 6 illustrates the messages processed per second and the processor PO extracted from the performance logs of FIG. 5 during a typical busy hour in an exemplary embodiment of the invention.

FIG. 7 illustrates the message counts and process PO of each node and the processor utilization of each message processed in an exemplary embodiment of the invention.

FIG. 8 illustrates the process PO and message counts of a highly networked integrated Home Location Register (IHLR) configuration with 4 nodes in the HLR cluster and the mobile supervision activity (MAS) feature turned on in an exemplary embodiment of the invention.

FIG. 9 illustrates the process PO and message counts of an IHMR configuration with 2 nodes in the HLR cluster without the MAS feature turned on in an exemplary embodiment of the invention.

FIG. 10 illustrates the process PO and message count of an IHLR configuration with 4 nodes in the HLR cluster and without the MAS feature turned on in an exemplary embodiment of the invention.

FIG. 11 illustrates the calculated profile update ratios and the autonomous registration (AR)/busy hour call attempts (BHCA) for busy hours in an exemplary embodiment of the invention.

FIG. 12 illustrates recommended values for the profile update ratio during busy hours for capacity prediction in an exemplary embodiment of the invention.

FIG. 13 illustrates the calculated BHCA capacity of a cluster with three different profile update ratios in an exemplary embodiment of the invention.

FIG. 14 illustrates the calculated cluster PO for supporting 2 million BHCA (3.5 AR/BHCA) with 6 nodes in the HLR cluster and the MAS feature turned on in an exemplary embodiment of the invention.

DETAILED DESCRIPTION OF THE INVENTION

FIGS. 1-16 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below may be combined in various ways to form multiple variations of the invention. As a result, the invention is not limited to the specific embodiments described below, but only by the claims and their equivalents.

Figure 1:
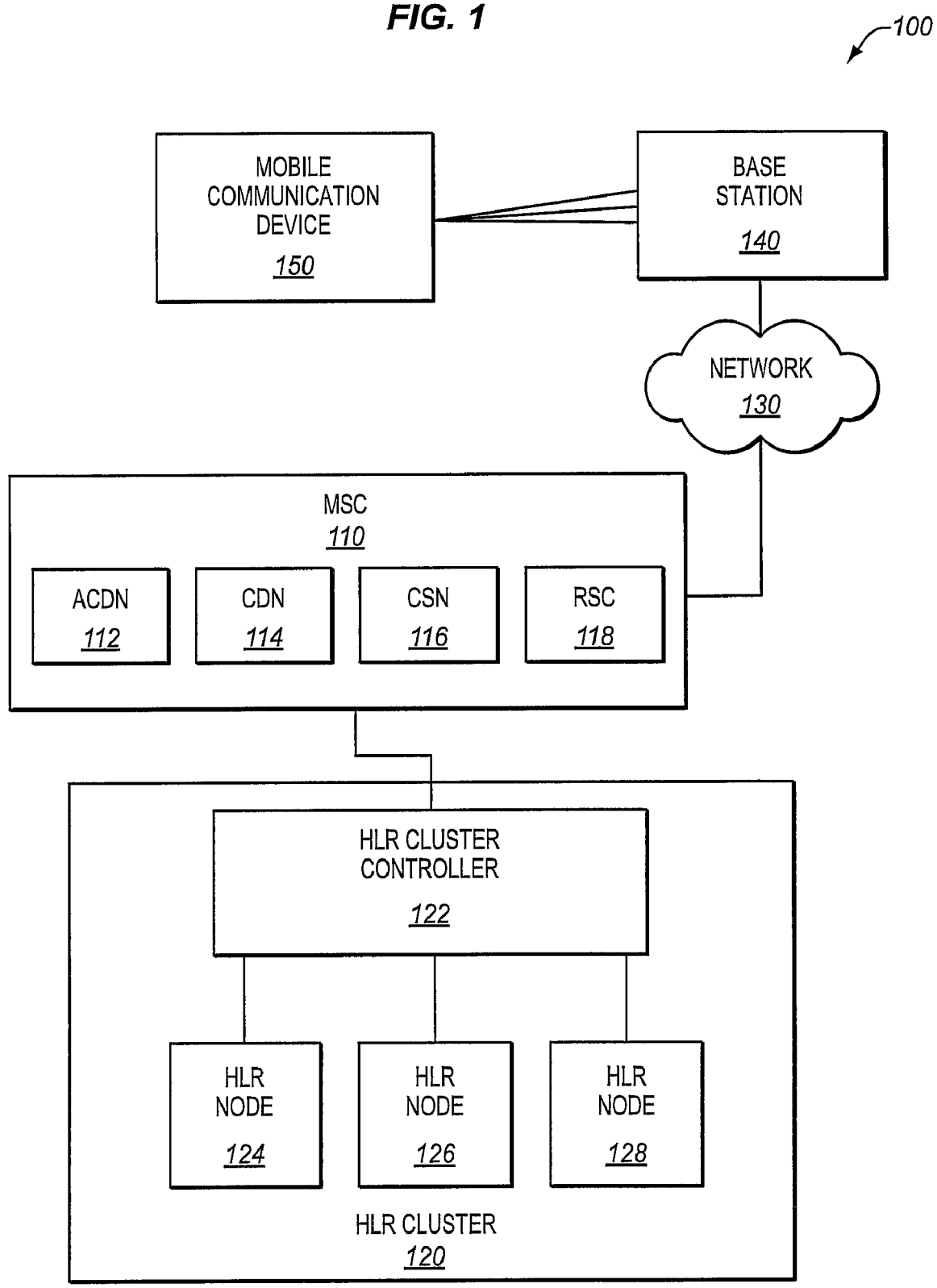
FIG. 1 illustrates a wireless communication network in an exemplary embodiment of the invention.

FIG. 1 illustrates a wireless communication network 100 in an exemplary embodiment of the invention. In one embodiment, wireless communication network 100 may be a code division multiple access (CDMA) network. Wireless communication network 100 includes a mobile communication device 150, which is adapted to place a call over wireless communication network 100. Mobile communication device 150 is served by one or more base stations 140 during the call. Base station 140 is coupled to an MSC 110 through network 130, and transmits the call (data corresponding to other events, such as autonomous registrations) to MSC 110 for processing.

MSC 110 is coupled to an HLR cluster 120 of HLR nodes 124-128. In one embodiment, HLR cluster 120 may be a home/visitor location register (HVLR) cluster of HVLR nodes. FIG. 2 illustrates a message flow of a call origination and termination in an exemplary embodiment of the invention. An initial message regarding a call origination is received in an Administrative Call Processing and Database Node (ACDN) 112 of MSC 110. Responsive to the call (or an autonomous registration or another event), ACDN 112 may need to access information in a subscriber profile record for mobile communication device 150. Thus, ACDN 112 transmits a subscriber profile query message (or an update, insertion or deletion message) to HLR cluster controller 122 of HLR cluster 120 as illustrated in FIG. 2. HLR cluster controller 122 then selects one of HLR nodes 124-128 to process the subscriber profile query message, and transmits information corresponding with the subscriber profile query to the selected HLR node 124-128 for processing. The selected HLR node 124-128 retrieves the requested subscriber profile record, and forwards the subscriber profile record to a Call Processing and Database Node (CDN) 114 assigned to process the call. If any changes to a subscriber profile record occur during the call, or if the MAS feature (see below for description of the MAS feature) is on, then CDN 114 will send a message to BLR cluster 120 requesting an update to the subscriber profile record. One of HLR nodes 124-128 is then selected by HLR cluster controller 122 to process the update to the subscriber profile record. The update is then replicated to other nodes in the cluster, such as by using the Unix Message/Internet Protocol (UX/IP) through an Applications Processor Cluster Complex Local Area Network (APCC LAN) (not shown). If bundling (to be described in detail below) is utilized, then the HLR node 124-128 processing the update will bundle the update message with other update messages, forming a larger message, and sends the bundled message to all other HLR nodes 124-128 for replication.

Assume, for example, that HLR cluster controller 122 receives a subscriber profile update request from CDN 114, and selects HLR node 124 to process the request from CDN 114. HLR node 124 updates its associated subscriber profile database. This information then needs to be replicated on HLR nodes 126 and 128. HLR node 124 transmits an update message to HLR node 126 and HLR node 128, instructing the peer nodes to update their associated subscriber profile databases such that each node of HLR cluster 120 stores a consistent subscriber profile database. Because the workload of HLR cluster 120 is balanced among HLR nodes 124-128, subsequent queries (and other events) regarding the subscriber profile record for mobile communication device 150 may be handled by any of HLR nodes 124-128. Thus, if MSC 110 transmits a query (or other command) to HLR cluster 120 regarding mobile communication device 150, then HLR cluster controller 122 can select HLR node 126 or 128 to handle the query, and HLR node 126 or 128 will process the query utilizing the most recent copy of the subscriber profile record.

The update and replication workload is increased significantly as more HLR nodes 124-128 are added to HLR cluster 120, especially in the case when a profile update is required for every call, AR, or another event. To relieve the replication workload, bundling of update messages for replication may be utilized. Message bundling reduces the message transmission and receiving overhead associated with messages sent between nodes. In addition to a reduction in the messaging overhead for update messages, there is also an application process overhead when an HLR node 124-128 works on a single message at a time. This application overhead consists mostly of context switching the application to work on the update message. Allowing an application to work on a single message that contains several bundled messages can reduce both the message transmission/reception overhead and the context-switching overhead. This reduction can be significant when the selected message is one that occurs hundreds or thousands of times per second.

In the event of an autonomous registration, a Cell Site Node (CSN) 116 of MSC 110 or a Radio Control Server (RCS) node 118 will forward the initial registration event message to HLR cluster controller 122. HLR cluster controller 122 will select an HLR node 124-128 to process the registration event as illustrated in FIG. 3. The selected node will retrieve and attach the subscriber profile to an AR message and forward it to CDN 114. If a profile update is required, such as a change to the last seen point for mobile communication device 150, or if the MAS feature is activated, then CDN 114 transmits a message to HLR cluster controller 122 node requesting an update to the subscriber profile record. Similar to the call origination situation described above, an HLR node 124-128 is selected to process the profile update, and the update is replicated to all other HLR nodes 124-128 using UX/IP via the APCC LAN.

The MAS feature of wireless communication network 100 tracks the active/inactive status of mobile communication device 150. If no activity (e.g., a registration) is detected based on the LAST ACTIVITY time stamp in the subscriber profile record over a specified time interval (e.g., two or three instances of the time-based AR interval), then mobile communication device 150 is considered inactive. This feature reduces activity of a paging channel, since a mobile communication device 150 marked as inactive is not paged. With the MAS feature, all ARs and calls require profile updating and replication of the time stamps in the subscriber profile databases. This significantly increases the processing workload of the cluster. Without the MAS feature, only a fraction of ARs and calls (e.g., 50%) require profile updates. This fractional number is defined herein as the "Profile Update Ratio", and represents the fraction of AR and call events requiring subscriber profile updates. The profile update ratio depends on the mobility of the subscribers within an MSC 110, and other factors such as the interval between instances of the time-based ARs, and varies between MSCs. High mobility of mobile communication devices in MSC 110 causes a higher profile update ratio. Within MSC 110, the profile update ratio may vary each hour depending on activities of a mobile communication device 150. In general, the profile update ratio is the highest during the peak call hours such as morning and evening rush hours. Field data indicates that the profile update ratio for MSCs without the MAS feature is generally between 0.4 and 0.65 (i.e., 40% to 65% of AR and call events require profile updates). For MSCs 110 with the MAS feature turned on, the profile update ratio equals 1 (i.e., 100% of subscriber profiles are updated for AR and call events). An increase in the profile update ratio increases the workload of HLR cluster 120 which in turn decreases the cluster capacity. This capacity reduction is significant when the updates occur hundreds or thousands of times per second. Field data has shown that the capacity reduction could reach 30% after the MAS feature is turned on.

It is often desirable for the processor occupancy of each HLR node 124-128 of HLR cluster 120 to be below a specified threshold value (e.g., 75%). If the processor occupancy of each node is above the threshold value, then additional HLR nodes 124-128 may be added to HLR cluster 120. As discussed above, it is difficult to determine the processor occupancy of HLR cluster 120, and thus, the capacity of HLR cluster 120, because there is not a straight linear relationship between the number of HLR nodes 124-128 in HLR cluster 120 and the capacity of HLR cluster 120. This is because when more HLR nodes 124-128 are added to HLR cluster 120, more processing time is expended by each HLR node 124-128 replicating the subscriber profile database of peer HLR nodes 124-128.

Figure 4:
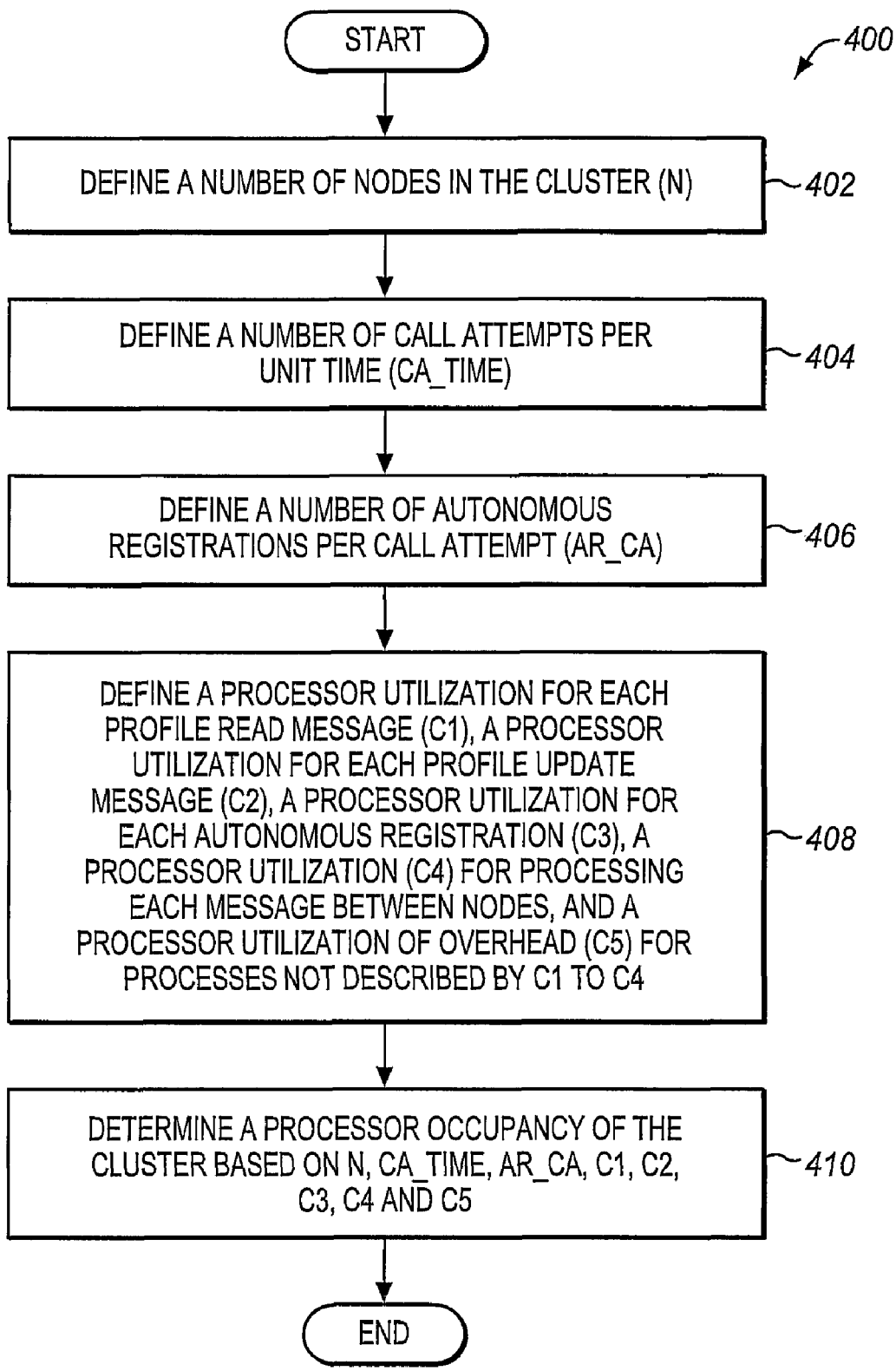
FIG. 4 illustrates a method for determining a processor occupancy of a cluster of HLRs in an exemplary embodiment of the invention.

FIG. 4 illustrates a method 400 for determining a processor occupancy of a cluster of HLRs in an exemplary embodiment of the invention. Method 400 will be discussed in reference to wireless communication network 100 of FIG. 1. The steps of method 400 are not all-inclusive, and may include other steps not shown for the sake of brevity.

Step 402 comprises defining a number of nodes in the cluster (N). The number of nodes N may be an existing number of nodes in an HLR cluster, or an expected number of nodes which will be installed in a cluster. For example, in HLR cluster 120 (see FIG. 1), the existing number of HLR nodes 124-128 is 3. An expected number of nodes for HLR cluster 120 could be 4 if a network operator plans to install an additional HLR node 124-128 in HLR cluster 120.

Step 404 comprises defining a number of call attempts per unit time (CA_time). The call attempts per unit time may be the average call attempts per unit time at any particular time for MSC 110. Alternatively, the call attempts per unit time may be the average number of call attempts at a peak time (i.e., the Busy Hour Call Attempts (BHCA), which is the number of times a telephone call is attempted during the busiest hour of the day) for MSC 110. For example, (CA_time) may be the number of BHCA per second, herein referred to as (BHCA_sec). Step 406 comprises defining a number of autonomous registrations per call attempt (AR_CA). The AR_CA may be the number of ARs per BHCA, herein referred to as (AR_BHCA).

Step 408 comprises defining a processor utilization for each profile read message (C1), a processor utilization for each profile update message (C2), a processor utilization for each autonomous registration (C3), a processor utilization for processing each message between nodes (C4), and a, processor utilization of overhead (C5) for processes not described by C1 to C4. An HLR has four major real-time processes (known as LRprofileRead, LRprofileUpdate, LRarAdmin, and UXipmgr) that handle profile read, update, administration, and UX/IP messaging, respectively. The hourly average processor PO, and messages handled per second of the processes are displayed in a nodal performance log.

Thus, a processor utilization for processing each call attempt (C_CA) may be defined based on the processor utilization for each profile read message (C1), a processor utilization for each profile update message (C2), and a processor utilization for processing each message between the HLR nodes (C4). Likewise, a processor utilization for processing each autonomous registration (C_AR) may be defined based on the processor utilization for each profile read message (C1), a processor utilization for each profile update message (C2), a processor utilization for each autonomous registration (C3), and a processor utilization for processing each message between the HLR nodes (C4).

FIG. 5 shows a typical nodal performance log table in a typical lab test. The performance log may be tabulated every hour for all the nodes in the cluster. The log contains a system-level (i.e., nodal-level) summary report and process-level information that includes a ranking of all of the processes by their PO usage. Of interest in the table for performance modeling is the processor occupancy of the four real time processes mentioned above. The real time process is indicated in the process-level information under the column of PRI (process priority). The real time process has priority of 100 or greater. Processes with a PRI of less than 100 are classified as time sharing processes. The NAME/NLWP column lists the names of the processes. The MSG column includes the number of messages processed per second. The % CPU column reports the percentage of processor occupancy used by the processes. For example, the UXipmgr processes 1327 messages per second on average and the processor occupancy used is 6.49%. The total real time processor occupancy used by all the real time processes is 17%, as shown in the system-level information under RT CPU (real time CPU). The total processor occupancy for all the processes (i.e., AP CPU shown in the table) is 23.51%. It includes all real time and time sharing processes. The capacity of the HVLR cluster is determined by the total real time processor occupancy which is identical to the overload control processor occupancy (i.e., OC CPU shown in the table). Message shedding (i.e., when messages are not processed) starts to occur when the OC CPU or RT CPU exceeds an engineering limit threshold (e.g., 75%). Note that there are a few other real time processes that have a constant processor occupancy, and their values are low. They are categorized herein as "Misc_overhead" processor occupancy, and referred to herein as C5.

Step 410 of FIG. 4 comprises determining a processor occupancy of the cluster based on N, CA_time, AR_CA, C1, C2, C3, C4 and C5. The processor occupancy may be expressed based on one of four models presented herein. In the first model, every AR or call event requires updating of the subscriber profile (i.e., 100% of subscriber profiles are updated, with the profile update ratio equal to 1). Each update is replicated to all other nodes in the cluster. This represents the case when the paging feature of MAS is turned on and every AR or call event requires updating of the LAST ACTIVITY time stamp of the subscriber profile. In the second model, a profile update is necessary if the location of mobile communication device 150 or other information regarding the subscriber is changed in the subscriber profile (i.e., the profile update ratio is less than 1). This represents the case without the MAS feature on MSC 110, or the feature is turned off on MSC 110. The third and fourth models deal with bundling of the profile updates of the first and second models for performance improvement. Each of the four models will be presented separately herein.

Cluster Processor Occupancy Model with the MAS Feature Turned On

When the MAS feature is turned on, every AR or call event requires a subscriber profile update. The processor occupancy of the HLR cluster in this case can be expressed as $$\text{Cluster } PO = \sum_{i=1}^{n} \text{Real Time } Process_i\_PO \quad \text{(equation 1)}$$
$$= \text{Read\_PO} + \text{Update\_PO} + \text{ARadmin\_PO} +$$
$$\text{UXipmgr\_PO} + \text{Misc\_overhead\_PO}$$

The variables used herein are defined as:
N=number of nodes in the cluster;
CA_time=number of call attempts per unit time;
AR_CA=number of ARs per call attempt (CA);
K=(AR_CA+1)×CA_time;
J=AR_CA×CA_time;
C1=processor utilization per LRprofileread message;
C2=processor utilization per LRprofileupdate message;
C3=processor utilization per LRarAdmin message;
C4=processor utilization per UXipmgr message;
C5=processor utilization of overhead for processes not described by C1-C4.

The values of C1 to C5 can be obtained from the lab tests.

K represents the number of calls and ARs per second in the system. J represents the number of ARs per second in the system. The values of C1 thru C4 are the average processor utilization (i.e., processing costs) per message processed by each of the named processes, and are generally in the unit of microsecond (us). C5 is the average PO of other processes not described by C1-C4.

Read_PO=The number of total profile read messages per second in the cluster*C1=2*K*C1(The value is ×2 for messages received & transmitted) (equation 2)

For every profile read for a call or AR, two read messages are processed (messages received from CDN 114 and sent back to CDN 114).

$$\text{Update\_PO} = \text{Number of total update messages per second in the cluster} * C2 \quad \text{(equation 3)}$$

$$\begin{aligned}\text{Number of total update messages} &= N * (\text{number of updates received from } CDN \text{ 114 on the node} \\&\quad + \text{number of updates transmitted to the peer nodes} \\&\quad + \text{number of updates received from the peer nodes}) \\&= N * ((K/N + (K/N)*(N-1) + (K/N)*(N-1)) \\&= (2*N-1)*K\end{aligned}$$

$$\text{Update\_PO} = (2*N-1)*K*C2 \quad \text{(equation 4)}$$

For a cluster with N active nodes, the total number of profile update messages and replication messages with the MAS feature on is $(2*N-1)*K$. This value is used to determine the profile update ratio in the case without the MAS feature operating on MSC 110 as described below.

$$\begin{aligned}\text{ARadmin\_PO} &= \text{Number of total } LRarAdmin \text{ messages per second in the cluster} * C3 \\&= J \times C3\end{aligned} \quad \text{(equation 5)}$$

$$\begin{aligned}\text{UXipmgr\_PO} &= \text{Number of total } UXipmgr \text{ messages per second in the cluster} * C4 \\&= (\text{number of read messages per second} \\&\quad + \text{number of update messages per second} \\&\quad + \text{number of AR administration messages per second}) * C4 \\&= (2*K + (2*N-1)*K + J)*C4 \\&= ((2*N+1)*K + J)*C4\end{aligned} \quad \text{(equation 6)}$$

$$\begin{aligned}\text{Misc\_overhead}(C5) &= \text{processor utilization of overhead} \\&\quad (\text{i.e., other processes}) \text{ not described by } C1 \text{ to } C4 \\&= \text{Overhead } PO \text{ per node} * N \\&= \text{Overhead} * N\end{aligned} \quad \text{(equation 7)}$$

By substituting equations 2 through 7 into equation 1, the performance model of HLR cluster 120 with the MAS feature on can be expressed as $$\text{Cluster Processor Occupancy} = 2*K*C1 + (2*N-1)*K*C2 + J*C3 + ((2*N+1)*K+J)*C4 + \text{Overhead}*N \quad \text{(equation 8)}$$

Due to load balancing, the real time processor occupancy of each node is:

$$\text{Node Processor occupancy} = \text{Cluster Processor occupancy}/N \quad \text{(equation 9)}$$

To avoid message shedding, the node processor occupancy should be less than or equal to a node processor occupancy threshold (e.g., 75%). The threshold may be determined based on desired design criteria. If the node processor occupancy is greater than the threshold, then additional HLR nodes 124-128 may be added to the cluster to increase the capacity of HLR cluster 120.

Cluster Processor Occupancy Model with the MAS Turned Off

When the MAS feature is turned off, every AR or call event does not require a subscriber profile update. By modifying equation 8, the processor occupancy of the HLR cluster in this case can be expressed as:

$$\text{Cluster } PO = 2*K*C1 + (2*N-1)*K*F*C2 + J*C3 + (2*K + (2*N-1)*K*F+J)*C4 + C5*N \quad \text{(equation 10)}$$

where:

F=Profile update ratio (i.e., how often profiles are updated—When the MAS feature is off, F is between 0 and 1 When the MAS feature is turned on, F=1)

=Fraction of updates of total ARs and calls.

The determination of the profile update ratio of MSC 110 can be difficult, tedious and time-consuming. A simple method is provided herein, where F can be calculated from:

$$F = \text{Total update messages in the cluster}/(2*N-1)*K \quad \text{(equation 11)}$$

The total update messages in the cluster can be obtained from the performance logs described above. It is the messages per second processed by LRprofileUpdate in the cluster. Examples of the calculation of F are provided below. Note that if F=1, then equation 10 is identical to equation 8 (i.e., the performance model with the MAS feature on).

Model Validations

Five validation examples are presented herein. The first three examples deal with a system with the MAS feature turned on. The last two examples deal with a system without the MAS feature turned on, and a calculation of the "profile update ratio", F, is demonstrated in these two examples. The number of HLR nodes 124-128 in HLR cluster 120 ranges from 2 to 6 in the examples. Four examples deal with an Integrated Home Location Register (IHLR) configuration, and one example deals with the Standalone Home Location Register (SHLR) configuration. The processor utilizations C1 to C4 are slightly different between these five examples. This is due to the platform speed differences and software release differences of the systems tested.

EXAMPLE #1

There are four nodes in the cluster of a system with an IHLR configuration. The MAS feature is on. FIG. 6 shows the messages processed per second and the process PO extracted from the performance logs. The system BHCA is 496K and AR/BHCA is 2.14. C1 through C4 are calculated from the sum of the process PO divided by the sum of the messages. The real time PO of the four nodes is 13.8%, 14.9%, 13.9%, and 15.4%, respectively (including an overhead PO (C5) of 2.6% in each node). The cluster PO is 58.01% (i.e., sum of the node real time POs).

Given:

N=4

BHCA=496K $CA\_\text{time} = 137\ BHCA/\text{sec}$ $AR\_CA = 2.14\ AR/BHCA$ $K = (AR\_CA+1)*CA\_\text{time} = 430$ $J = AR\_CA*CA\_\text{time} = 293$ $C1 = 55$ us, $C2 = 58$ us, $C3 = 146$ us, and $C4 = 54$ us $C5 = 2.6\%$ Recall that K is defined as the number of calls and ARs per second in the system, and J is defined as the number of ARs per second in the system.

$$\begin{aligned}
\text{Cluster PO} &= 2*K*C1 + (2*N-1)*K*C2 + J*C3 + ((2*N+1)*K \\
&\quad + J)*C4 + C5*N \\
&= 2*430*55 + 7*430*58 + 293*146 + (9*430 + 293)*54 \\
&\quad + 26{,}000*4 \\
&= 593{,}480 \text{ us (Cluster PO of 59.35\%, 14.8\% per node)}
\end{aligned}$$

| Measured Cluster PO | Model Cluster PO | Relative Diff (Model/Measured) |
|---|---|---|
| 58.01% | 59.35% | +2.3% |

EXAMPLE #2

The HLR cluster of an IHLR configuration has 6 nodes with the MAS feature turned on. With 503K BHCA and 2.28 AR/BHCA, the PO of each node is 14.93%, 14.53%, 15.0%, 14.99%, 13.33%, and 15.31% (Cluster PO of 88.09%). The overhead PO (e.g., C5) is 2.6% per node. FIG. 7 illustrates the message counts and process PO of each node and the processor utilization of each message processed in an exemplary embodiment of the invention.

Given:

```
N = 6
BHCA = 503K
CA_time = 139 BHCA/sec
AR_CA = 2.28 AR/BHCA
K = (AR_CA + 1)*CA_time = 456
J = AR_CA*CA_time = 317
C1 = 65 us, C2 = 54 us, C3 = 140 us, and C4 = 56 us
C5 = 2.6%
```

$$\begin{aligned}
\text{Cluster PO} &= 2*K*C1 + (2*N-1)*K*C2 + J*C3 + ((2*N+1)*K \\
&\quad + J)*C4 + C5*N \\
&= 2*456*65 + 11*456*54 + 317*140 + (13*456 \\
&\quad + 317)*56 + 26{,}000*6 \\
&= 882{,}500 \text{ us (88.25\% Cluster PO of 14.70\% per node)}
\end{aligned}$$

| Measured Cluster PO | Model Cluster PO | Relative Diff (Model/Measured) |
|---|---|---|
| 88.09% | 88.25% | +0.2% |

EXAMPLE #3

A highly networked system with an IHLR configuration has 4 nodes in the HLR cluster with the MAS feature turned on. At 571K BHCA and 2.7 AR/BHCA, the detailed message counts and PO of each node are shown in FIG. 8.

By substituting N, K, J, and C1 through C4 to the performance model, the difference between the Cluster PO between the measured data and the performance model is 3%.

| Measured Cluster PO | Model Cluster PO | Relative Diff (Model/Measured) |
|---|---|---|
| 75.77% | 78.05% | +3.0% |

EXAMPLE #4

A system with an SHLR configuration has 2 nodes in the HLR cluster, and operates without the MAS feature. At 1190K BHCA with 1.15 AR/BHCA, the message counts and process PO are shown in FIG. 9. The overhead PO (C5) of each node is 2.1%. The calculation of the "profile update ratio", F, is demonstrated in this example.

Given:

$N=2$ $BHCA=1190K$ $CA\_time=330\ BHCA/sec$ $AR\_CA=1.15\ AR/BHCA$ $K=(AR\_CA+1)*CA\_time=710$ $J=AR\_CA*CA\_time=380$ $C1=50$ us, $C2=93$ us, $C3=139$ us, and $C4=62$ us $C5=2.6\%$ The total update messages in the cluster can be obtained from FIG. 9 (i.e., 903), and applied to equation 11 to calculate the "profile update ratio", F.

$$\begin{aligned}
F &= \text{Total update messages in the cluster}/(2*N-1)*K \\
&= 903/2130 \\
&= 0.42 \text{ (i.e., 42\% of calls and ARs require profile updates)}
\end{aligned}$$

If the system has the MAS feature turned on, then the update messages in the cluster would be 2130 based on (2*N−1)*K.

By substituting F, N, K, J, C1 through C4, and a 2.1% overhead PO (C5) into the performance model when the MAS feature is turned off, the calculated Cluster PO is 41.97% (Node PO 21%).

$$\begin{aligned}
\text{Cluster PO} &= 2*K*C1 + (2*N-1)*K*F*C2 + J*C3 + (2*K \\
&\quad + (2*N-1)*K*F + J)*C4 + 21{,}000*N \\
&= 41.97\%
\end{aligned}$$

| Measured Cluster PO | Model Cluster PO | Relative Diff (Model/Measured) |
|---|---|---|
| 42.36% | 41.97% | −1.0% |

The overhead PO and cost per update message in this example are different from those in the other three examples. This is attributed to a difference in the platforms between the examples.

EXAMPLE #5

An IHLR configuration has 4 nodes in the HLR cluster without the MAS feature turned on. At 490K BHCA, and 2.2 AR/BHCA, the PO of each processor is 11.92%, 11.07%, 11.73% and 13.13% (Cluster PO of 47.85%) as shown in FIG. 10. The overhead PO (C5) of each node is 2.6%.

Given:

$$N=4$$

$$BHCA=490K$$

$$CA\_time = 136\ BHCA/sec$$

$$AR\_CA = 2.2\ AR/BHCA$$

$$K = (AR\_CA+1)*CA\_time = 435$$

$$J = AR\_CA*CA\_time = 299$$

$$C1=56\ us,\ C2=65\ us,\ C3=147\ us,\ and\ C4=66\ us$$

$$C5=2.6\%$$

The total update messages may be obtained from FIG. 10 (i.e., 1630) to calculate the profile update ratio, F.

$$F = \text{Total update messages in the cluster}/(2*N-1)*K$$
$$= 1630/3045$$
$$= 0.53\ (\textit{i.e.},\ 53\%\ \text{of calls and ARs require profile updates})$$

By substituting N, F, K, J, C1 through C4, and a 2.6% overhead PO (C5) to the performance model, the calculated Cluster PO is 48.57%.

| Measured Cluster PO | Model Cluster PO | Relative Diff (Model/Measured) |
|---|---|---|
| 47.85% | 48.57% | +1.5% |

Advantages of the Models and Suggested Values of the Profile Update Ratio

The above validation examples demonstrate that the predicted HLR cluster PO compares well with the measured data. The proposed method of determination of the "profile update ratio", F, is simple and effective. To facilitate prediction of the cluster capacity for systems without the MAS feature turned on, values of the profile update ratio in busy hours of many MSCs with various configurations are calculated. FIG. 11 shows the calculated profile update ratios and the AR/BHCA during busy hours. It represents a wide range of MSCs. As expected, the MSCs with higher AR/BHCA values also have higher profile update ratio values. The recommended values of the profile update ratio for capacity prediction during busy hours is provided in FIG. 12. For MSCs with the MAS feature turned on, the profile update ratio is 1.

Application of the Models

The performance models can be used to determine the BHCA capacity of HLR cluster 120. Assume an AR=3.5/BHCA, and the values of C1 thru C4 are of 56 us, 58 us, 146 us, and 54 us respectively. The overhead PO (C5) is 2.6% per node. The processor occupancy threshold is 75% PO per node. FIG. 13 depicts the calculated BHCA capacity of a cluster with three different profile update ratios. The cluster BHCA capacity decreases significantly as the profile update ratio increases. The effect is more pronounced as the number of nodes in the cluster increases. The case when the profile update ratio=1 represents the MAS feature turned on.

As illustrated in FIG. 13, the cluster BHCA capacity does not scale linearly with the number of nodes. As more nodes are added to the cluster, more processing time is required for update replication. However, message bundling may be applied in wireless communication network 100 for performance improvement.

Update Message Bundling

Profile updates can be bundled by each HLR node 124-128 for replication to peer nodes. Bundling reduces update and UX/IP messages, and thus, increases the capacity of HLR cluster 120. A bundle includes a number of profile updates forwarded to peer nodes when a specified interval of a timer (e.g., 100 milliseconds (ms)) expires, or a specified bundle message size (e.g., 2000 bytes) is exceeded. Bundling introduces a slight time delay. This delay can be minimized by properly selecting the interval of the timer and/or the bundle message size.

A "Bundling Factor", (B), represents a number of updates messages bundled into one transmission between nodes, and is defined as B=1/number of updates in a bundle (e.g., B=0.1, 10 updates in a bundle; B=0.5, 2 updates in a bundle; B=1 no bundling)

The number of total update messages in a cluster with the MAS feature on and update bundling can be expressed as:

$$\begin{aligned}\text{Number of total update messages} &= N*(\text{number of updates received from CDN 114 on one node} \\ &\quad + \text{number of update bundles received from peer nodes} \\ &\quad + \text{number of update bundles transmitted to peer nodes}) \\ &= ((K/N + (K/N)*(N-1)*B + (K/N)*(N-1)*B)*N \\ &= K + 2*K*B*(N-1)\end{aligned} \quad (\text{equation 12})$$

A processor utilization for processing a bundle of update messages "C2_bundle" is defined as $$\begin{aligned}C2\_bundle &= cpu\ \text{cost}\ (us)\ \text{per bundle} \\ &= C2 + U*(1-B)/B\end{aligned} \quad (\text{equation 13})$$

C2_bundle is the cost of unbundling and performing the updates included in the bundle. C2 is the cost per update message without utilization of bundling as defined before. U is the cost per update after unbundling. U is less than C2. Assuming 20 us for U and 56 us for C2 and 10 updates in a bundle (B=0.1), the cost of a bundle is 236 us (56+20*9=236). If B=1 (i.e., no bundling), C2_bundle equals C2. The 56 us of C2 includes unbundling the message and the first update in the bundle. For the remaining 9 updates, each one costs 20 us.

The performance model with update bundling can be expressed as

With MAS:

$$\text{Cluster } PO = 2*K*C1 + ((K+K*B*(N-1))*C2 + K*B*\\(N-1)*C2\_bundle + J*C3 + ((3*K+2*K*B*(N-1) + J)*C4 + C5*N \quad \text{(equation 14)}$$

Without MAS:

$$\text{Cluster } PO = 2*K*C1 + ((K+K*B*(N-1))*F*C2 + K*B*\\(N-1)*F*C2\_bundle + J*C3 + ((2*K+K*F + 2*K*B*F*(N-1) + J)*C4 + C5*N \quad \text{(equation 15)}$$

If B=1 (no bundling), equations 14 and 15 are reduced to equations 8 and 10 (i.e., the performance models without bundling).

Performance Improvement by Bundling

It is assumed that C1 through C4 are 55 us, 54 us, 144 us, and 45 us, respectively. Note that C2 is 54 us, and U is less than C2. It is assumed that 40% of the processor utilization in C2 is due to a record update (i.e., the cost of U), and the other 60% of the processor utilization is expended opening the message and for other related work. Thus, U is assumed to be 20 us in this calculation. As mentioned above, message bundling can reduce both the message transmission and reception overhead and the context-switching overhead. This reduction can be significant when the selected message is one that occurs hundreds or thousands of times per second. FIG. 14 illustrates the calculated Cluster PO for supporting 2M BHCA (3.5 AR/BHCA) with 6 nodes in the cluster and the MAS feature turned on. As expected, the performance increases as the number of updates in a bundle increases. Capacity increases by a factor of 2.15 if a bundle contains 10 updates. At a 2M BHCA call load, each node will receive 416 updates per second ((2,000,000/3600)*(3.5+1)/6=416) from CDNs 114. Each update is about 2.5 ms apart. With 10 updates in a bundle, the update delay is about 25 ms. This delay is considered acceptable. Note that the calculation assumes a cost of 20 us per update within a bundle. If U is assumed to be 30 us and 40 us, there still is significant performance improvement factor (1.85 for 30 us and 1.75 for 40 us) over the case with no bundling.

Determining a Number of HLR Nodes Needed for a Cluster

Figure 15:
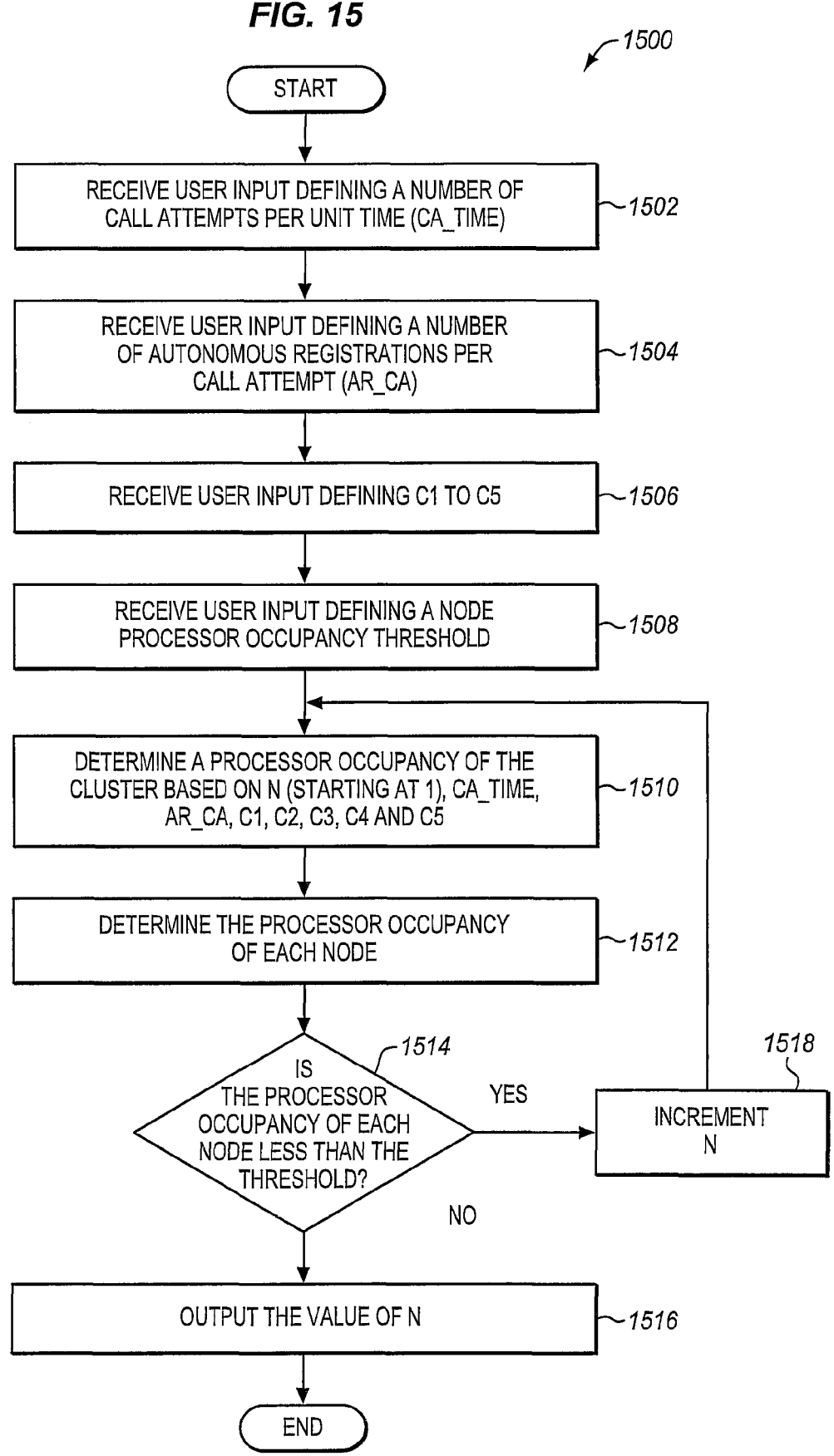
FIG. 15 illustrates a method for determining a number of HLR nodes for an HLR cluster in an exemplary embodiment of the invention.

The models described above may be utilized to determine a number of home HLR nodes 124-128 needed in an HLR cluster. FIG. 15 illustrates a method 1500 for determining a number of HLR nodes for an HLR cluster in an exemplary embodiment of the invention. Method 1500 will be discussed in reference to wireless communication network 100 of FIG. 1. The steps of method 1500 are not all inclusive, and may include other steps not shown for the sake of brevity.

Step 1502 comprises receiving user input comprising a number of call attempts per unit time (CA_time). Step 1504 comprises receiving user input comprising a number of autonomous registrations per call attempt (AR_CA). Step 1506 comprises receiving user input comprising a processor utilization for each profile read message (C1), a processor utilization for each profile update message (C2), a processor utilization for each autonomous registration (C3), a processor utilization for processing each message between nodes (C4), and a processor utilization of overhead (C5) for processes not described by C1 to C4.

Step 1508 comprises receiving user input comprising a node processor occupancy threshold. The node processor occupancy threshold represents a maximum desired value of the processor occupancy of each BLR node 124-128. If the node processor occupancy is above this threshold, then message shedding may occur. This threshold will be based on desired design criteria of a network operator.

After the variables are defined, an estimation of the number of HLR nodes (N) needed for the HLR cluster may be determined such that a node processor occupancy of each of the HLR nodes is less than or equal to a node processor occupancy threshold. The value of N is determined by recursively performing for each value of N the following steps until the processor occupancy of each node is less than or equal to the node processor occupancy threshold. In one embodiment of the invention, the recursive process may start with a value of N equal to 1.

Step 1510 comprises determining a processor occupancy of the cluster based on N, CA_time, AR_CA, C1, C2, C3, C4 and C5. Step 1512 comprises determining the processor occupancy of each of the HLR nodes. The processor occupancy of each node is equal to the processor occupancy of the cluster divided by N. Step 1514 comprises determining whether the processor occupancy of each node is less than or equal to the node processor occupancy threshold.

If the value of the processor occupancy of each node is greater than the node processor occupancy threshold, then the method comprises incrementing the value of N in step 1518. Processing then continues in step 1510. In one embodiment of the invention, the value of N may be incremented by one.

If the value of the processor occupancy of each node is less than or equal to the node processor occupancy threshold, then the method comprises outputting the value of N in step 1516. Outputting may comprise displaying the value of N on a display device, printing or presenting the value of N on a printer or presentation device, providing any type of audio or visual indicator to a user, storing the value of N to a storage medium, or transmitting the value of N to another device or process. Thus, a network operator will receive an estimation of the number of HLR nodes 124-128 needed in the cluster based on the processor occupancy of each node.

Figure 16:
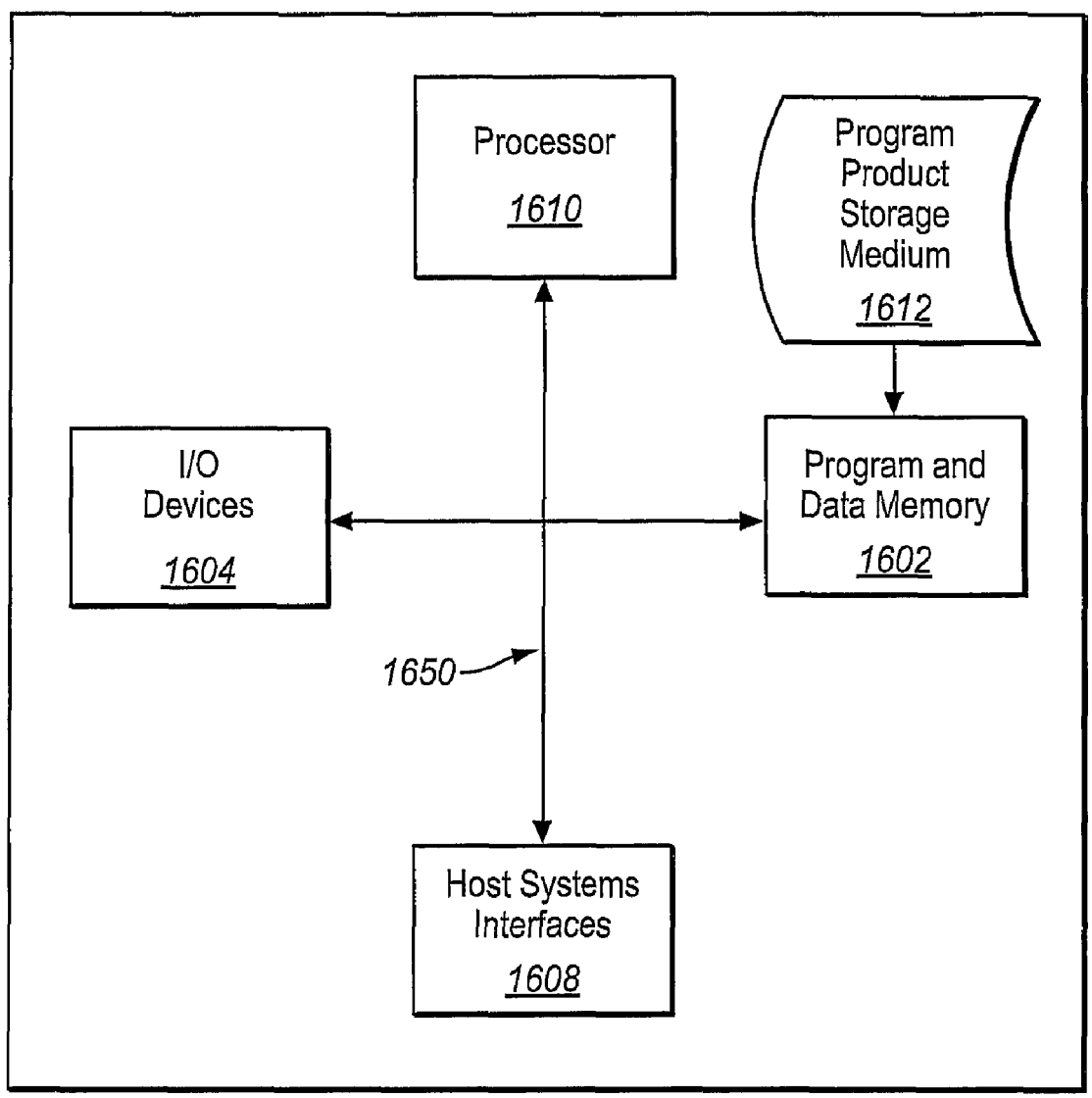
FIG. 16 is a block diagram of an exemplary data processing system that may determine a number of HLR nodes for an HLR cluster in an exemplary embodiment of the invention.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 16 is a block diagram depicting a data processing system 1600 adapted to provide features and aspects hereof for determining a number of HLR nodes for an ILR cluster by executing programmed instructions and accessing data stored on a computer readable storage medium 1612.

Furthermore, the invention can take the form of a computer program product accessible from a computer-usable or computer-readable medium 1612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Data processing system 1600 suitable for storing and/or executing program code will include at least one processor 1610 coupled directly or indirectly to memory elements 1602 through a system bus 1650. The memory elements can include local memory employed during actual execution of the program code, bulk storage, and cache memories which provide temporary storage of at least some program code in order to reduce the number of times code must be retrieved from bulk storage during execution.

Input/output or I/O devices 1604 (including but not limited to keyboards, displays, pointing devices, etc.) can be coupled to the system either directly or through intervening I/O controllers. Network adapters or other host system interfaces 1608 may also be coupled to the system to enable the data processing system to become coupled to other data processing systems or storage devices through intervening private or public networks. Modems, cable modems, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method for determining processor occupancy of a cluster of home location registers (HLRs), the method comprising:
    defining a number of nodes in the cluster (N);
    defining a number of call attempts per unit time (CA_time);
    defining a number of autonomous registrations per call attempt (AR_CA);
    defining a processor utilization for processing each call attempt (C_CA);
    defining a processor utilization for processing each autonomous registration (C_AR); and
    determining, via a hardware processor, a processor occupancy of the cluster based on N, CA_time, AR_CA, C_CA, C_AR.

2. The method of claim 1, wherein defining the processor utilization for processing each call attempt (C_CA) and defining the processor utilization for processing each autonomous registration (C_AR) further comprises:
    defining a processor utilization for each profile read message (C1);
    defining a processor utilization for each profile update message (C2);
    defining a processor utilization for each autonomous registration (C3);
    defining a processor utilization for processing each message between nodes (C4); and
    defining a processor utilization of overhead (C5) for processes not described by C1 to C4, and wherein determining the processor occupancy further comprises:
    determining a processor occupancy of the cluster based on N, CA_time, AR_CA, C1, C2, C3, C4 and C5.

3. The method of claim 2, wherein the processor occupancy is equal to 2\*K\*C1+(2\*N−1)\*K\*C2+J\*C3+((2\*N+1)\*K\*J)\*C4+C5\*N, with K equal to (AR_CA+1)\*CA_time, and J equal to (AR_CA\*CA_time).

4. The method of claim 1 further comprising:
    estimating a number of nodes needed in the cluster based on the processor occupancy of the cluster.

5. The method of claim 1 further comprising:
    determining a processor occupancy of each node, wherein the processor occupancy of each node is equal to the processor occupancy of the cluster divided by N.

6. The method of claim 5 further comprising:
    estimating a number of nodes needed in the cluster based on the processor occupancy of each node.

7. The method of claim 5, further comprising:
    determining whether the processor occupancy of each node is less than or equal to a threshold value;
    incrementing the value of N responsive to determining that the processor occupancy of each node is greater than the threshold value; and
    determining a first new value of the processor occupancy based on the incremented value of N.

8. The method of claim 7, further comprising:
    determining whether the first new value of the processor occupancy is less than or equal to the threshold value; and
    performing, for each value of N until the value of the processor occupancy of each node is less than or equal to the threshold value, the recursive steps of:
    incrementing the value of N;
    determining a second new value of the processor occupancy of the cluster based on the increased value of N;
    determining whether the second new value of the processor occupancy of the cluster is less than or equal to the threshold value; and
    outputting the value of N responsive to determining that the second new value of the processor occupancy of the cluster is less than or equal to the threshold value.

9. The method of claim 1, further comprising:
    defining a profile update ratio (F) of how often user profiles are updated,
    wherein the processor occupancy of the cluster is determined based on N, CA_time, AR_CA, C_CA, C_AR, and F.

10. The method of claim 1, further comprising:
    defining a bundling ratio (B) based on a number of update messages bundled into one transmission between nodes; and
    defining a processor utilization for processing a bundle of update messages (C2_bundle),
    wherein the processor occupancy of the cluster is based on N, CA_time, AR_CA, C_CA, C_AR, B and C2_bundle.

11. A method for determining a number of home location register (HLR) nodes for an HLR cluster, the method comprising:
    receiving user input comprising a number of call attempts per unit time (CA_time);
    receiving user input comprising a number of autonomous registrations per call attempt (AR_CA);
    receiving user input comprising a processor utilization for each profile read message (C1), a processor utilization for each profile update message (C2), a processor utilization for each autonomous registration (C3), a processor utilization for processing each message between nodes (C4), and a processor utilization of overhead (C5) of processes not described by C1 to C4;
    receiving user input comprising a node processor occupancy threshold; and
    estimating the number of HLR nodes (N) needed for the HLR cluster such that a node processor occupancy of each of the HLR nodes is less than or equal to the node processor occupancy threshold by recursively performing, for each value of N until the processor occupancy of each node is less than or equal to the node processor occupancy threshold, the steps of:
    determining a processor occupancy of the cluster based on N, CA_time, AR_CA, C1, C2, C3, C4 and C5;
    determining the processor occupancy of each of the HLR nodes, the processor occupancy of each node being equal to the processor occupancy of the cluster divided by N;

determining whether the processor occupancy of each node is less than or equal to the node processor occupancy threshold;

outputting the value of N responsive to determining that the processor occupancy of each node is less than or equal to the node processor occupancy threshold; and incrementing the value of N responsive to determining that the processor demand of each node is greater than the node processor occupancy threshold.

12. The method of claim 11, wherein the processor occupancy of the cluster is equal to $2*K*C1+(2*N-1)*K*C2+J*C3+((2*N+1)*K*J)*C4+C5*N$, with K equal to $(AR\_CA+1)*CA\_time$, and J equal to $(AR\_CA*CA\_time)$.

13. The method of claim 11, further comprising:
receiving user input defining a profile update ratio (F) of how often user profiles are updated,
wherein the processor occupancy of the cluster is equal to $2*K*C1+(2*N-1)*K*F*C2+J*C3+(2*K+2*(N-1)*K*F+J)*C4+C5*N$, with K equal to $(AR\_CA+1)*CA\_time$, and J equal to $(AR\_CA*CA\_time)$.

14. The method of claim 11, further comprising:
receiving user input defining a bundling ratio (B) based on a number of update messages bundled into one transmission between nodes; and
receiving user input defining a processor utilization for processing a bundle of update messages (C2_bundle),
wherein the processor occupancy of the cluster is equal to $2*K*C1+((K+K*B*(N-1)*C2 +K*B*(N-1))*C2\_bundle +J*C3+(3*K+2*K*B*(N-1) +J)*C4+C5*N$, with K equal to $(AR\_CA+1)*CA\_time$, and J equal to $(AR\_CA*CA\_time)$.

15. The method of claim 11 further comprising:
receiving user input defining a bundling ratio (B) based on a number of update messages bundled into one transmission between nodes;
receiving user input defining a processor utilization for processing a bundle of update messages (C2_bundle); and
receiving user input defining a profile update ratio (F) of how often a user profile is updated,
wherein the processor occupancy of the cluster is equal to $2*K*C1+(K+K*B*(N-1))*F*C2+K*B*(N-1)*C2\_bundle+J*C3+((3*K*F+2*K*B*F*(N-1)+J)*C4+C5*N$, with K equal to $(AR\_CA+1)*CA\_time$, and J equal to $(AR\_CA*CA\_time)$.

16. A non-transitory computer program product comprising a computer useable medium including a computer readable program, wherein the computer readable program when executed on a computer causes the computer to:
receive user input comprising a processor utilization for each profile read message (C1), a processor utilization for each profile update message (C2), a processor utilization for each autonomous registration (C3), a processor utilization for processing each message between nodes (C4), and a processor utilization of overhead (C5) for processes not described by C1 to C4;
receive user input comprising a node processor occupancy threshold; and
estimate the number of HLR nodes (N) needed for the HLR cluster such that a node processor occupancy of each of the HLR nodes is less than or equal to the node processor occupancy threshold by recursively performing, for each value of N until the processor occupancy of each node is less than or equal to the node processor occupancy threshold, the steps of:
determining a processor occupancy of the cluster based on N, CA_time, AR_CA, C1, C2, C3, C4 and C5;
determining the processor occupancy of each of the HLR nodes, the processor occupancy of each node being equal to processor occupancy of the cluster divided by N;
determining whether the processor occupancy of each node is less than or equal to the node processor occupancy threshold;
outputting the value of N responsive to determining that the processor occupancy of each node is less than or equal to the node processor occupancy threshold; and
incrementing the value of N responsive to determining that the processor occupancy of each node is greater than the node processor occupancy threshold.

17. The computer program product of claim 16, wherein the processor occupancy of the cluster is equal to $2*K*C1+(2*N-1)*K*C2+J*C3+((2*N+1)*K*J)*C4+C5*N$, with K equal to $(AR\_CA+1)*CA\_time$, and J equal to $(AR\_CA*CA\_time)$.

18. The computer program product of claim 16, further causing the computer to:
receive user input defining a profile update ratio (F) of how often user profiles are updated,
wherein the processor occupancy of the cluster is equal to $2*K*C1+(2*N-1)*K*F*C2+J*C3+(2*K+2*(N-1)*K*F+J)*C4+C5*N$, with K equal to $(AR\_CA+1)*CA\_time$, and J equal to $(AR\_CA*CA\_time)$.

19. The computer program product of claim 16, further causing the computer to:
receive user input defining a bundling ratio (B) based on a number of update messages bundled into one transmission between nodes; and
receive user input defining a processor utilization for processing a bundle of update messages (C2_bundle),
wherein the processor occupancy of the cluster is equal to $2*K*C1+((K+K*B*(N-1)*C2+K*B*(N-1))*C2\_bundle +J*C3+(3*K+2*K*B*(N-1) +J)*C4+C5*N$, with K equal to $(AR\_CA+1)*CA\_time$, and J equal to $(AR\_CA*CA\_time)$.

20. The computer program product of claim 16, further causing the computer to:
receive user input defining a bundling ratio (B) based on a number of update messages bundled into one transmission between nodes;
receive user input defining a processor utilization for processing a bundle of update messages (C2_bundle); and
receive user input defining a profile update ratio (F) of how often a user profile is updated,
wherein the processor occupancy of the cluster is equal to $2*K*C1+(K+K*B*(N-1))*F*C2+K*B*(N-1)*C2\_bundle+J*C3 +((3*K*F+2*K*B*F*(N-1)+J)*C4+C5*N$, with K equal to $(AR\_CA+1)*CA\_time$, and J equal to $(AR\_CA*CA\_time)$.

* * * * *

UNITED STATES PATENT AND TRADEMARK OFFICE
CERTIFICATE OF CORRECTION

PATENT NO.         : 8,159,950 B2
APPLICATION NO.    : 11/851035
DATED              : April 17, 2012
INVENTOR(S)        : Ma et al.

It is certified that error appears in the above-identified patent and that said Letters Patent is hereby corrected as shown below:

In column 3, line 16, the text "the BLR cluster" should read -- the HLR cluster --

In column 4, line 2, the text "IHMR configuration" should read -- IHLR configuration --

In column 5, line 13, the text "to BLR cluster 120" should read -- to HLR cluster 120 --

In column 15, line 64, the text "each BLR node 124-128" should read -- each HLR node 124-128 --

In column 16, line 43, the text "for an ILR cluster" should read -- for an HLR cluster --

Signed and Sealed this
Twenty-ninth Day of May, 2012

David J. Kappos
*Director of the United States Patent and Trademark Office*